United States Patent
Dobson et al.

(10) Patent No.: US 11,854,394 B1
(45) Date of Patent: Dec. 26, 2023

(54) SYSTEMS AND METHODS FOR CURATED NAVIGATIONAL ROUTE MANAGEMENT

(71) Applicant: AUTOMOTIVE EVENTS, INC., Rocky River, OH (US)

(72) Inventors: Iain W. Dobson, Cleveland, OH (US); Joshua D. Wilwohl, Cleveland, OH (US)

(73) Assignee: AUTOMOTIVE EVENTS, INC., Rocky River, OH (US)

( * ) Notice: Subject to any disclaimer, the term of this patent is extended or adjusted under 35 U.S.C. 154(b) by 185 days.

(21) Appl. No.: 17/243,957

(22) Filed: Apr. 29, 2021

Related U.S. Application Data

(63) Continuation of application No. 16/718,310, filed on Dec. 18, 2019, now Pat. No. 11,024,173.

(60) Provisional application No. 62/781,664, filed on Dec. 19, 2018.

(51) Int. Cl.
  *G08G 1/0968* (2006.01)
  *G01C 21/34* (2006.01)
  *G01C 21/36* (2006.01)
  *G08G 1/0969* (2006.01)

(52) U.S. Cl.
  CPC ..... *G08G 1/096838* (2013.01); *G01C 21/3476* (2013.01); *G01C 21/3697* (2013.01); *G08G 1/096811* (2013.01); *G08G 1/096861* (2013.01); *G08G 1/0969* (2013.01)

(58) Field of Classification Search
  CPC .... G01C 21/32; G01C 21/34; G01C 21/3476; G01C 21/3484; G01C 21/3679; G01C 21/3682; G01C 21/3697; G01S 19/34; G01S 19/42; G01S 19/47; G01S 19/52; G06F 16/29; G06F 16/387; G08G 1/0962; G08G 1/096827; G08G 1/096838
  See application file for complete search history.

(56) References Cited

U.S. PATENT DOCUMENTS

2012/0143501 A1* 6/2012 Tang ................. G01C 21/3476
  701/445
2018/0328743 A1* 11/2018 Sullivan ................. G06F 16/29

* cited by examiner

*Primary Examiner* — Charles J Han
(74) *Attorney, Agent, or Firm* — Ulmer & Berne LLP (57) ABSTRACT

Systems and methods are disclosed for the development and management of curated navigational routes are disclosed. The curated navigational route can be a particular path of travel that is specifically designed for one or more users. The curated navigational routes are carefully constructed paths of travel that are custom defined by a route manager.

20 Claims, 11 Drawing Sheets

SYSTEMS AND METHODS FOR CURATED NAVIGATIONAL ROUTE MANAGEMENT

CROSS-REFERENCE TO RELATED APPLICATIONS

This application is a continuation of U.S. patent application Ser. No. 16/718,310, entitled SYSTEMS AND METHODS FOR CURATED NAVIGATIONAL ROUTE MANAGEMENT, filed on Dec. 18, 2019, which claims the benefit of U.S. provisional patent application Ser. No. 62/781,664, filed on Dec. 19, 2018, entitled SYSTEMS AND METHODS FOR CURATED NAVIGATIONAL ROUTE MANAGEMENT, the disclosure of which is incorporated herein by reference in its entirety.

BACKGROUND

With proliferation of global positioning systems and location tracking services provided by mobile devices, such as smartphones, as well as onboard vehicle systems, drivers have access to various mapping and navigational options. Such navigation systems conventionally route a driver between a first destination and second destination based on pre-defined routing algorithms. Some algorithms aim to optimize the route based on various parameters, such as shortest distance, fastest route, road type, and so forth.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Various non-limiting embodiments of the present disclosure will now be described to provide an overall understanding of the principles of the structure, function, and use of systems, apparatuses, devices, and methods disclosed. One or more examples of these non-limiting embodiments are illustrated in the selected examples disclosed and described in detail with reference made to FIGS. 1-11 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems, and can use other protocols, or operate at other layers in communication protocol stacks, then are described.

As described in more detail below, the present disclosure generally relates to the development and management of curated navigational routes. A user can travel the specially designed route, such that the user's progress is tracked. For the purposes of illustration, the present disclosure is described largely in the context of a driver operating an automobile and driving the automobile along the curated navigational route. It is to be appreciated however, that this disclosure is not limited to automobiles. Instead, depending on the use case, curated navigational routes can be navigated by any suitable vehicle, such as a bicycle, snowmobile, motorcycle, scooter, horse, boat, kayak, canoe, or other suitable mode of transportation. Further, in some embodiments, a user of the system may be on foot and interact with the system via a mobile communications device.

The curated navigational route can be a particular path of travel that is specifically designed for one or more users. In one example embodiment, the curated navigational route is intended to be travelled in a car that is being reviewed by a journalist or other type of reviewer or assessor of the vehicle. In this regard, the curated navigational route can be specifically designed to include various sections or types of roadways that highlight certain performance aspects of the vehicle. The curated navigational route can also be designed to avoid certain types of roadways or routes. In another example embodiment, the curated navigational route is intended to be travelled by a photographer. The curated navigational route can intentionally take the photographer proximate to one or more photo opportunities. In another example embodiment, the curated navigational route is intended to be travelled by a sightseer, with the curated navigational route taking the sightseer past one or more points of interest. As is to be appreciated, the curated navigational routes described herein are therefore not simply routes that are automatically generated by a GPS system to direct a user from a starting destination to a final destination. Instead, curated navigational routes in accordance with the present disclosure can be thoughtful, carefully constructed paths of travel that are custom defined by a route manager, as described in more detail below.

In some embodiments, a user of the system can access the curated navigational route through a specialized application executing on a mobile communications device, such as a smart phone. In some embodiments, a user of the system can access the curated navigational route through an in-dash navigation system in a vehicle. In any event, using GPS-based functionality, the user can be directed along the curated navigational route through prompts on a graphical user interface or, in some cases, voice prompts.

Figure 1:
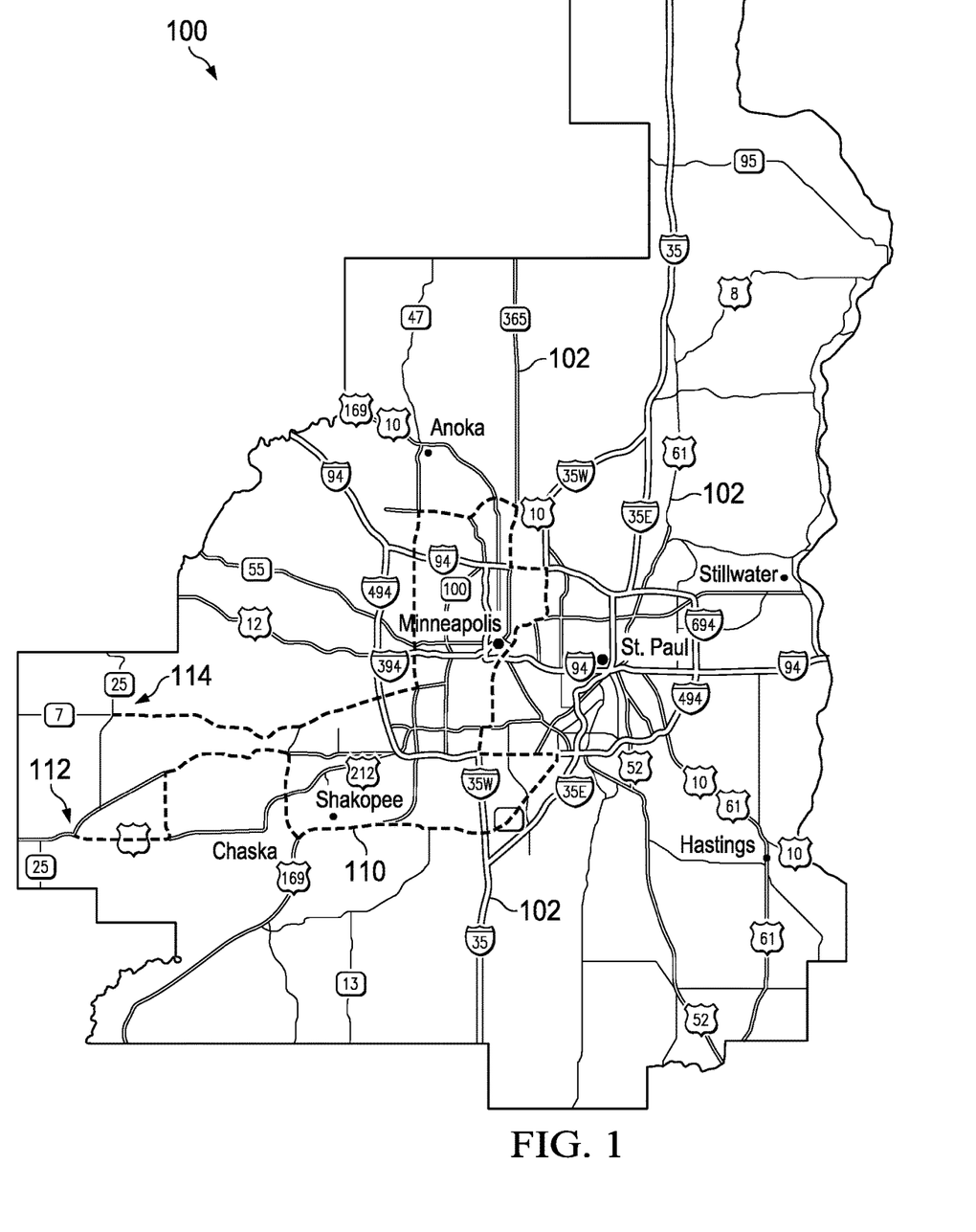
FIG. 1 illustrates a map with a curated navigational route in accordance with one example embodiment.

FIG. 1 illustrates a map 100 having a plurality of roadways 102 in accordance with one example embodiment. The map 100 schematically shows an example curated navigational route 110 that has a starting point 112 and an ending point 114. In this embodiment, the curated navigational route 110 is a specific path around a major metropolitan area. It is to be readily appreciated, however, that in other embodiments a curated navigational route can include rural areas, mountainous areas, dessert areas, lakes, rivers, and so forth. Furthermore, depending on the use case, a curated navigational route may include pathways (i.e., non-roadways), such as for biking or hiking applications. Additionally, a curated navigational route may be through a theme park, a national park, a university campus, business campus, and so forth.

Figure 2:
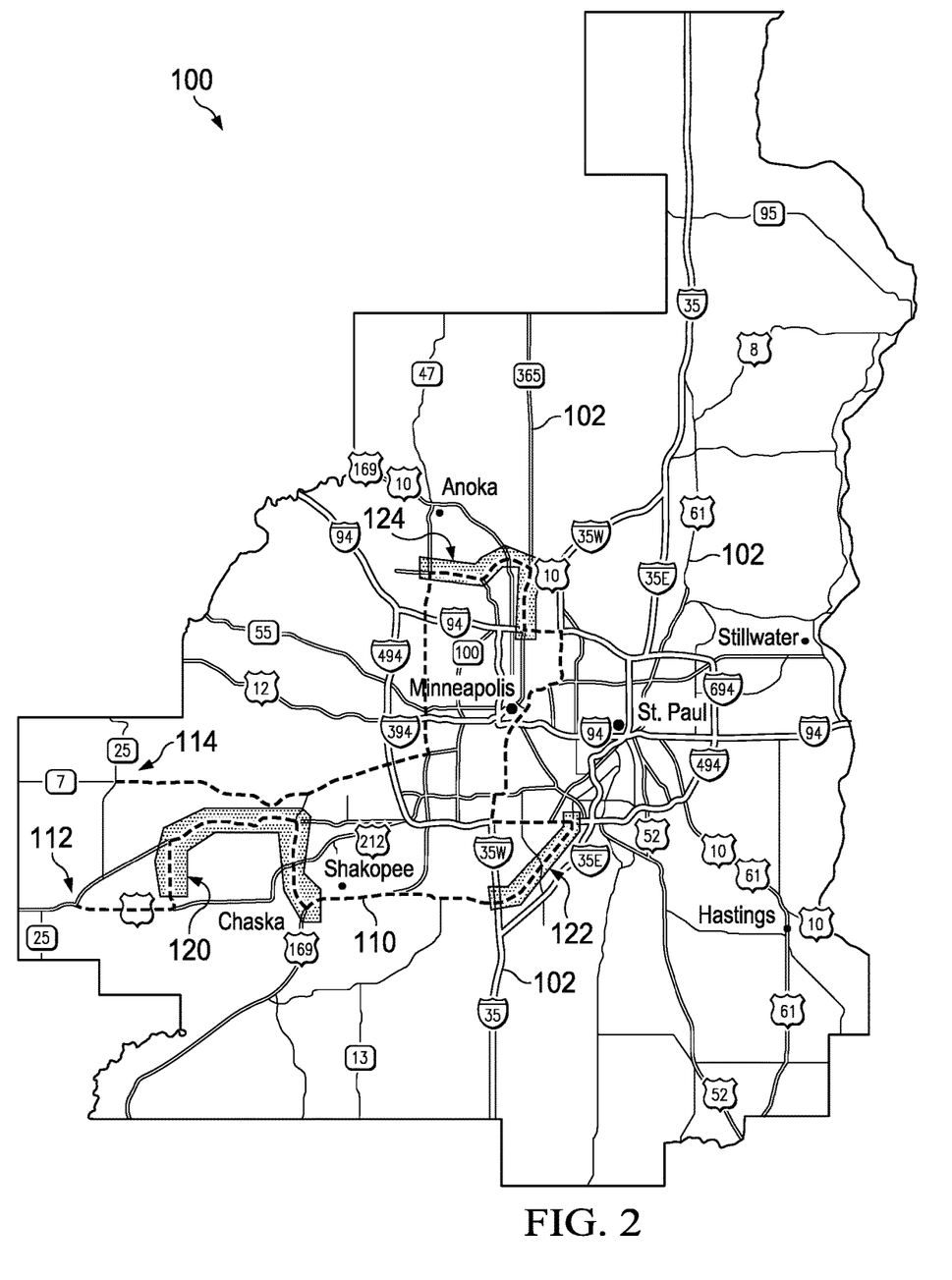
FIG. 2 depicts the curated navigational route of FIG. 1 with various legs highlighted for illustration purposes.

The curated navigational route 110 can be specifically selected to have certain characteristics. By way of example, FIG. 2 depicts the curated navigational route 110 with legs 120, 122, 124 highlighted for illustration purposes. Each of these legs 120, 122, 124 can, for instance, have a characteristic that caused the route manager to include those portions of roadway in the curated navigational route 110. For instance, a route manager may wish to design a curated navigational route 110 that specifically shows the handling capability of a particular vehicle. Accordingly, leg 120 may include a series of tight turns, leg 122 may include long straightaways at highway speeds, and leg 124 may include a mountain access road. Additionally, the curated navigational route 110 can intentionally avoid roads with certain characteristics, such as bumpy terrain.

Figure 3:
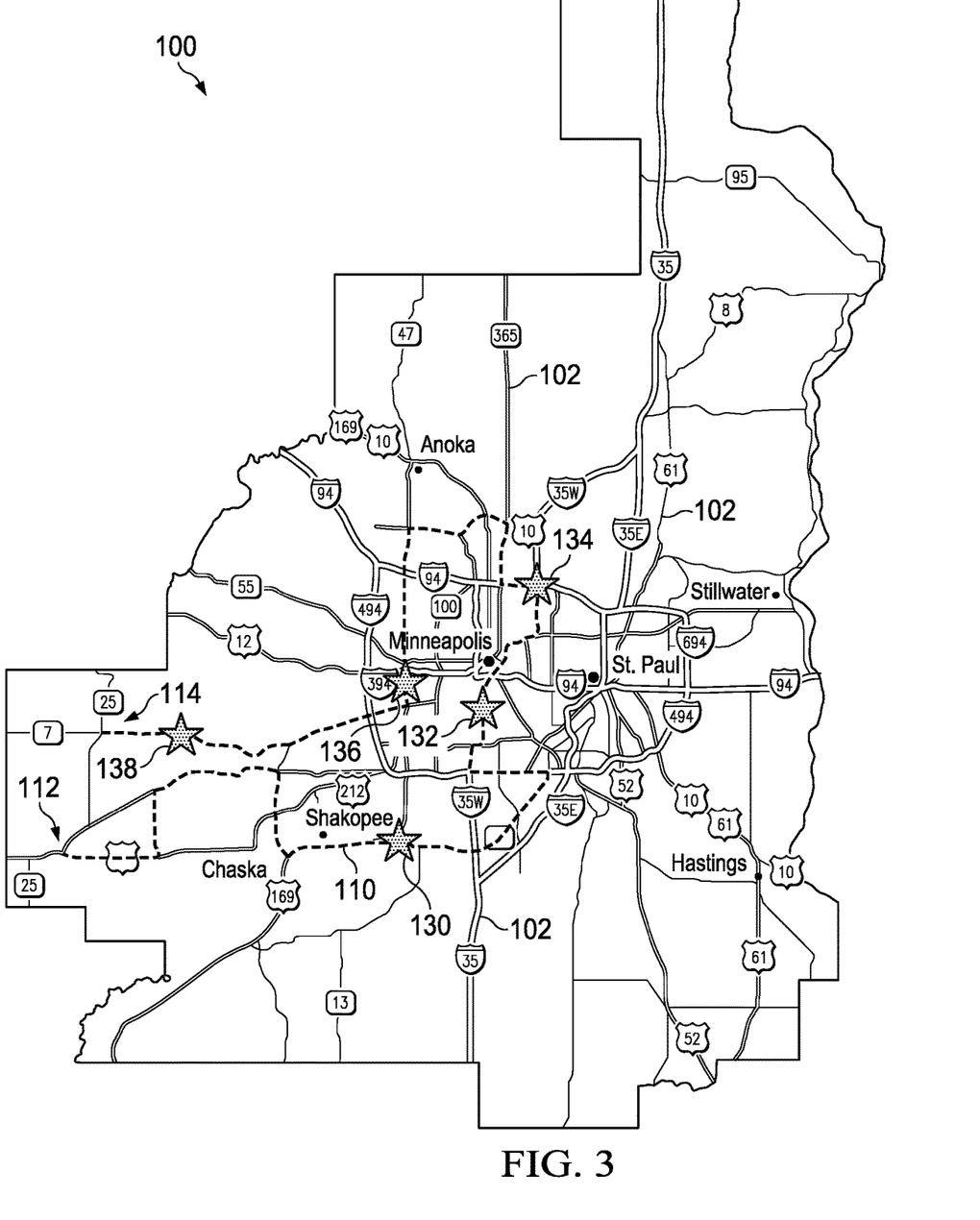
FIG. 3 depicts points of interest along the curated navigational route of FIG. 1.

Additionally, or alternatively, the curated navigational route 110 can be based on specific points of interest. FIG. 3 depicts points of interest 130, 132, 134, 136, 138 along the curated navigational route 110. The points of interest 130, 132, 134, 136, 138 will vary based on use case, but in some example embodiments, they can be photo opportunities, for example. Users traveling along the curated navigational route 110 can receive information regarding the points of interest 130, 132, 134, 136, 138 via an interface on their mobile communications device and/or in-dash vehicle display. Such information may provide suggestions on the best way to photograph the points of interest (camera settings, etc.) or may provide other details.

Figure 4:
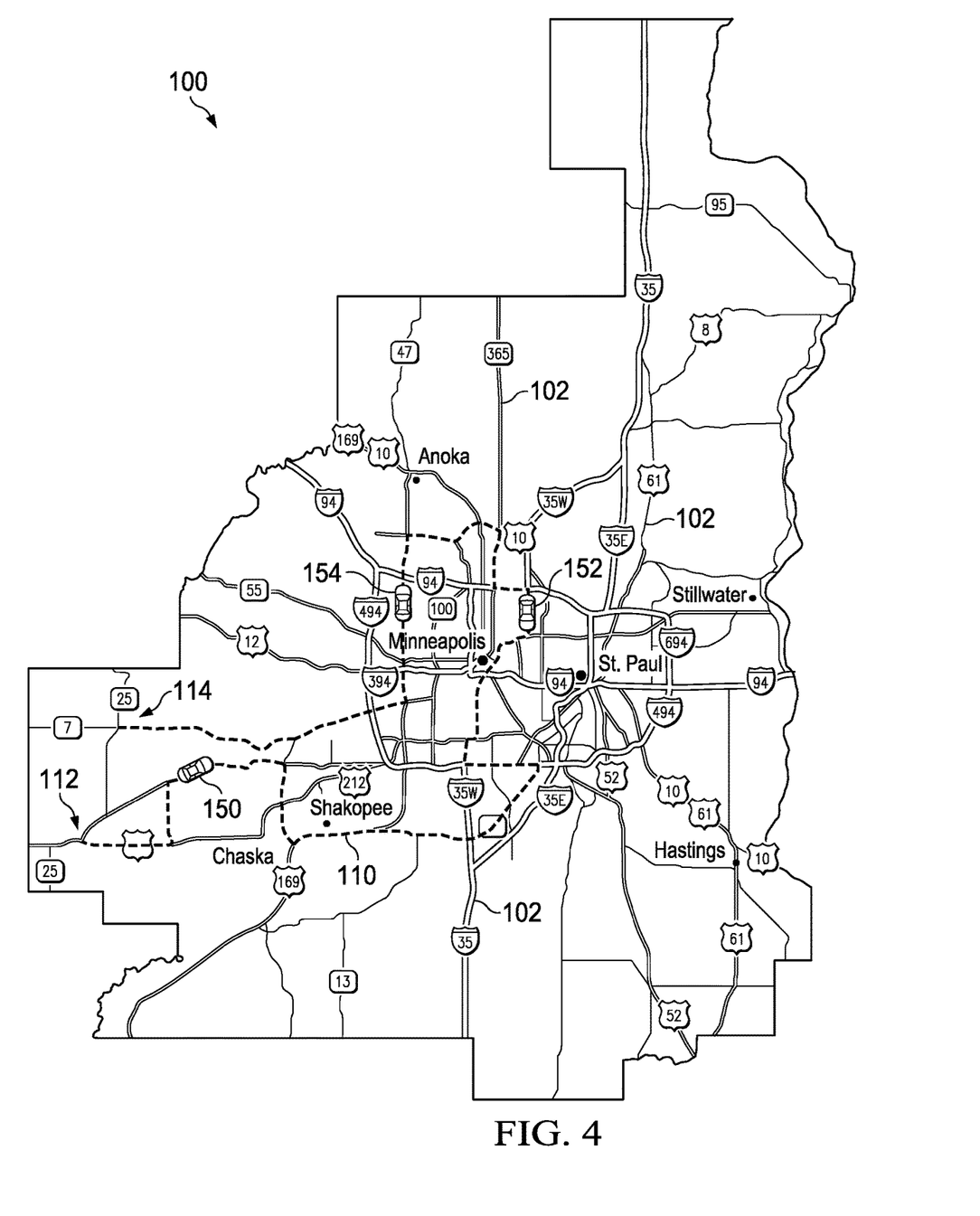
FIG. 4 shows a first vehicle, a second vehicle, and a third vehicle traveling along the curated navigational route.

Referring now to FIG. 4, a first vehicle 150, a second vehicle 152, and a third vehicle 154 are schematically shown driving along the curated navigational route 110. An operator associated with vehicle (either driver or passenger) can be presented with the curated navigational route 110 on a suitable interface, with turn by turn directions provided.

Figure 5:
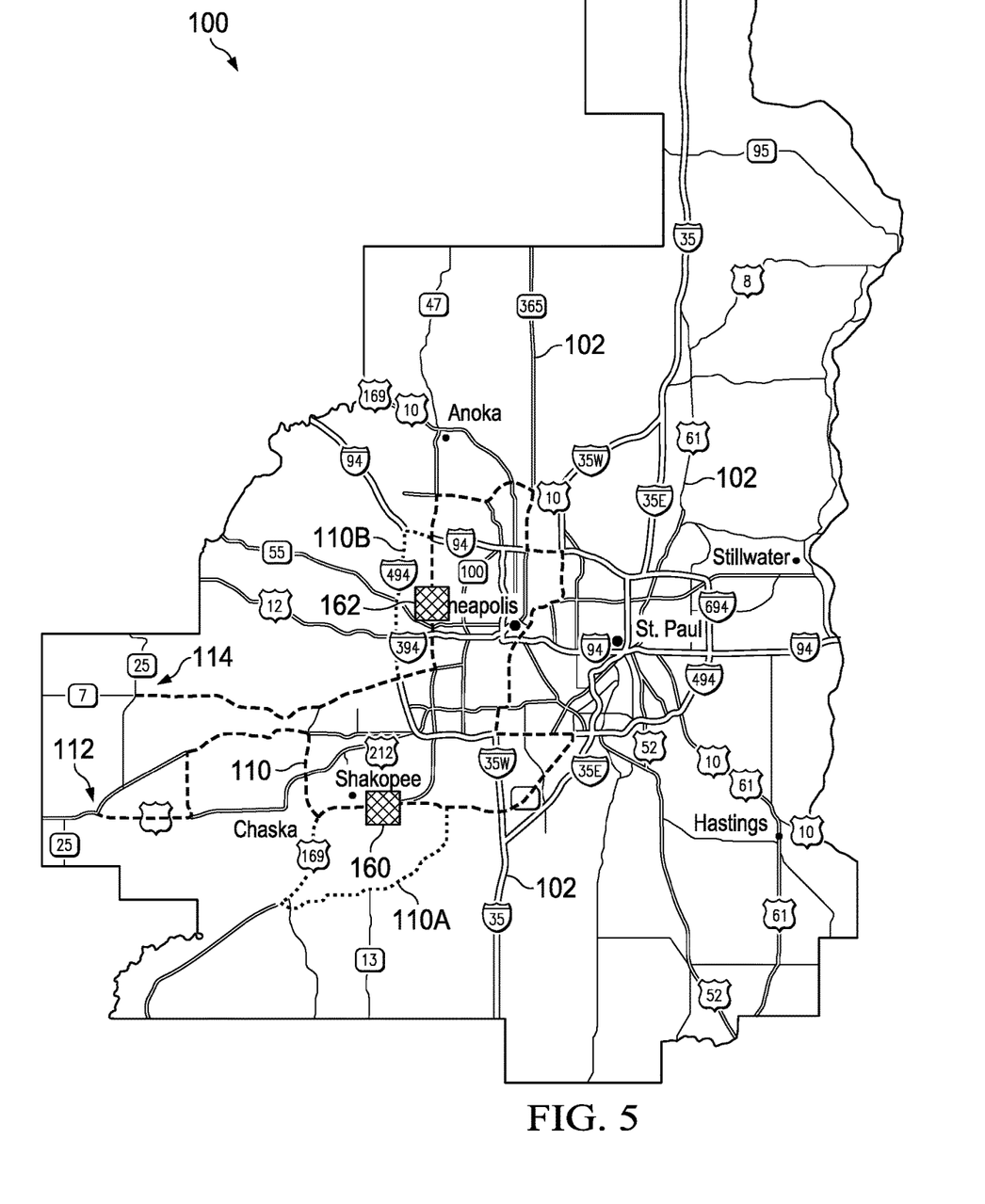
FIG. 5 depicts alternate routes that temporarily deviate from the curated navigational route.

In some situations, the route manager can design and include optional routes that can be utilized on an as-needed basis. FIG. 5 depicts alternate routes 110A and 110B. For example, the route manager may be aware of potential obstructions 160 and 162. In the event the obstructions 160 or 162 are present, alternate routes 110A and 110B can be designed to allow a user to avoid the blockage, while still traveling on a curated route. One or more alternate routes can be stored in the system and, depending on the operational conditions, a route manager (or other administrator) can activate some or all of the alternate routes for some or all of the vehicles. Therefore, in the event of a blockage, the route manager can be assured that the drivers will be directed to a pre-determined route, as opposed to potentially traveling along a route with unknown characteristics. In some cases, drivers may be automatically directed to one or more of the alternate routes 110A and 110B based on real-time operational conditions, such as a heavy traffic or police activity, for example.

Figure 6:
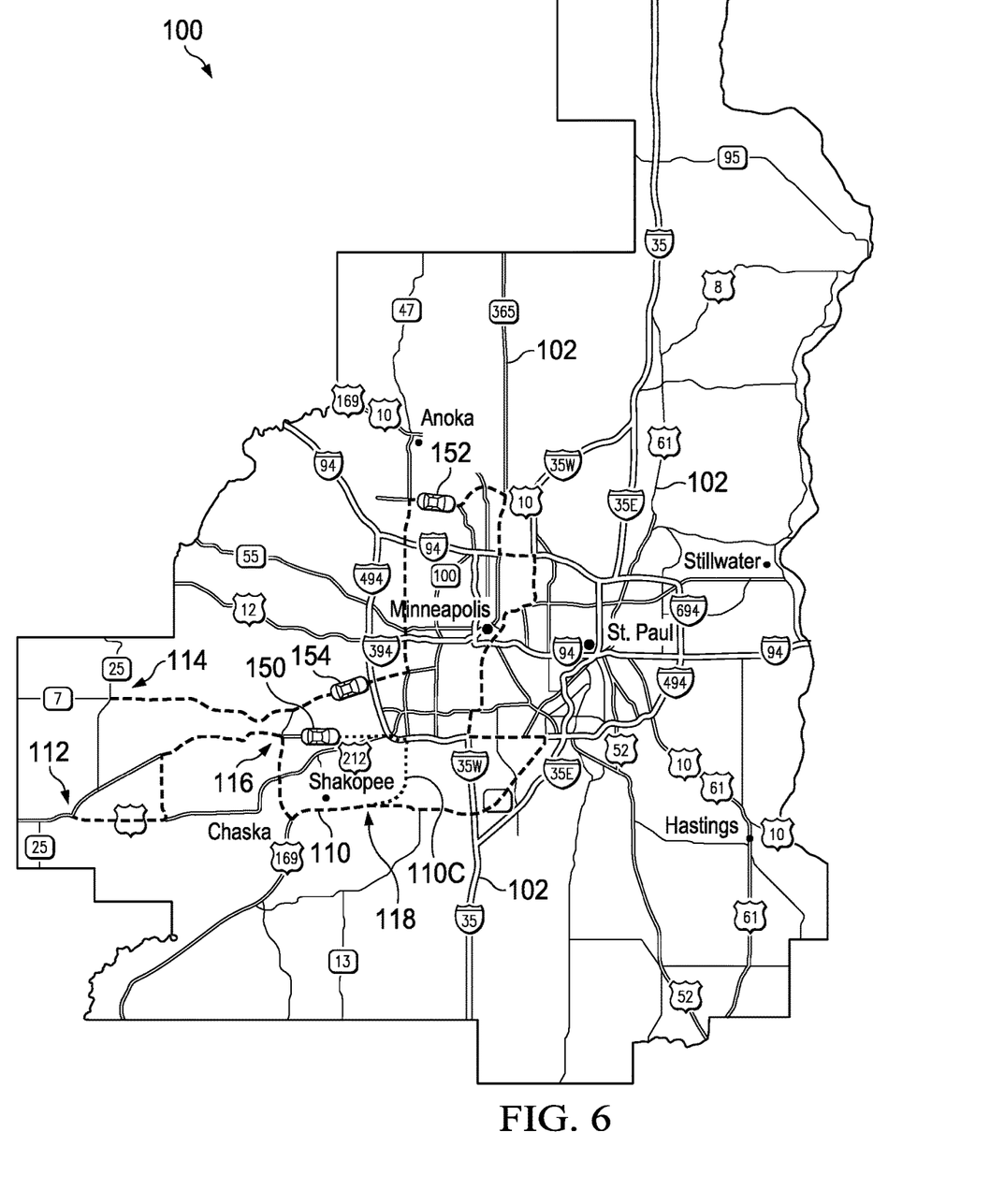
FIG. 6 depicts an example operational use case in which a driver of the first vehicle missed a turn at an intersection and began to deviate from the curated navigational route.

FIG. 6 depicts an example operational use case in which the driver of the first vehicle 150 missed the turn at intersection 116 and began to deviate from the curated navigational route 110. Since the system is tracking the vehicles' positions in real-time, navigational instructions can be provided to the operator of the first vehicle 150 to immediately direct them back to rejoin the curated navigational route 110 at rejoined point 118 via an alternate path 110C. In this regard, the amount of time the driver of the first vehicle 150 drives on a non-curated path can be minimized.

Figure 7:
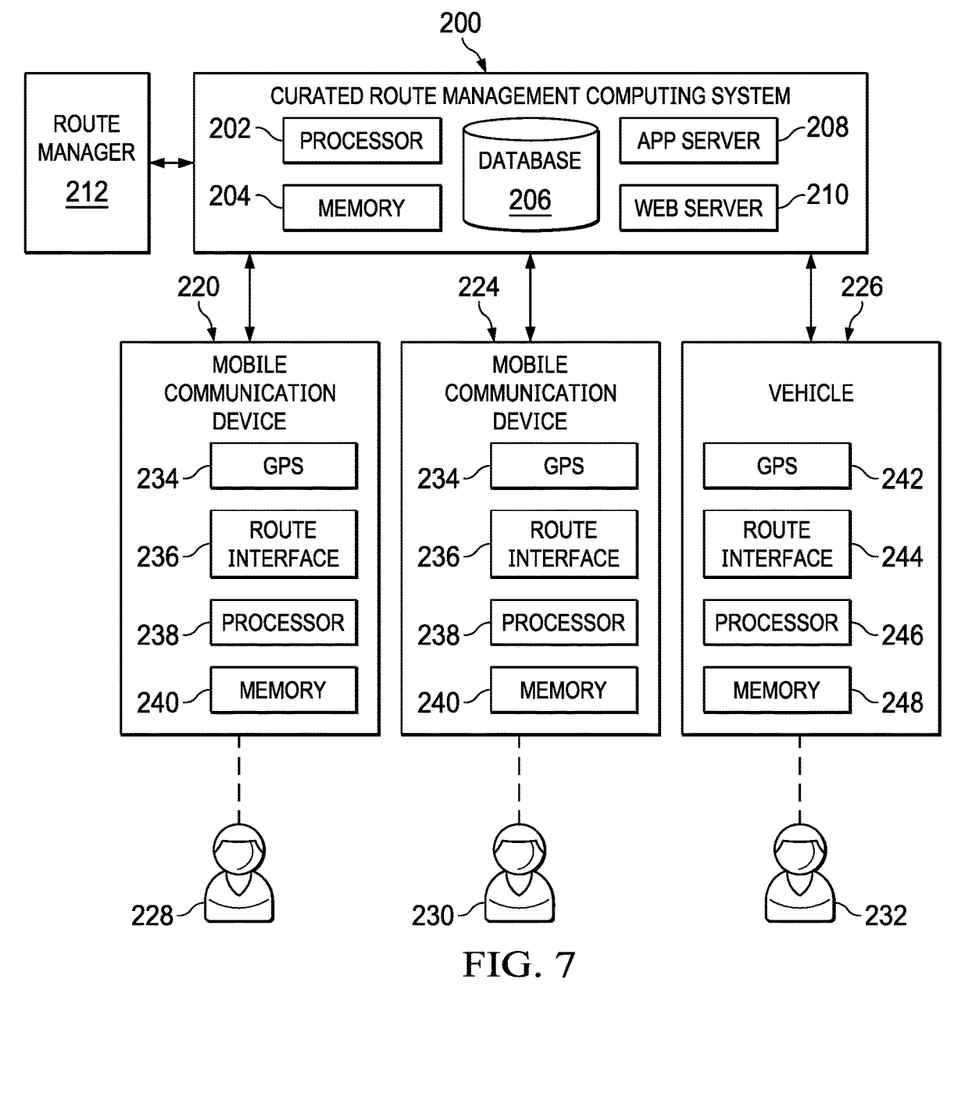
FIG. 7 is a system diagram in accordance with one non-limiting embodiment.

FIG. 7 is a system diagram in accordance with one non-limiting embodiment. A curated route management computing system 200 is shown to be in communication with users 228, 230, and 232 through various types of devices. For instance, the curated route management computing system 200 is in networked communications with mobile communication devices 220 and 244. Each of the mobile communication devices 220 and 244 can be any suitable networked device, such as a smartphone, a tablet, a gaming device, a headset computing device, a wearable computing device, and so forth. The mobile communication devices 220 and 244 can include, for example, a GPS module 234, a processor 238, and a memory unit 240. Information can be conveyed to the user via a route interface 236. In some embodiments, the route interface 236 is a screen on a smart phone, or a screen on a wearable, or other suitable type of interface.

The curated route management computing system 200 is also shown to be in networked communications with a vehicle 226 in FIG. 7. The vehicle 226 can have network connectivity through a cellular network, a WiFi network, or other type of data network, for example. The vehicle 226 can include a GPS module 242, a processor 246, and a memory unit 248. Information can be conveyed to the user via a route interface 244. In some embodiments, the route interface 244 is a portion of dashboard, center counsel, an infotainment display, or a heads-up display, for example. In some embodiments, a mobile communication device in communication with the curated route management computing system 200 is also connected to the vehicle 226 through a suitable networking protocol, such as BLUETOOTH or other short range networking protocol. As such, the connected communication device receive information from the curated route management computing system 200 and provide that information to vehicle 226 for display on the route interface 244 through the network connection.

FIG. 7 schematically depicts a route manager computing device 212 interacting with the curated route management computing system 200. A route manager may use the route manager computing device 212 to design a curated route, track travel progress, receive notifications, communicate with the operators of the vehicles, and so forth. The route manager computing device 212 can be any suitable computing device, such as a mobile communication device, laptop, desktop, tablet, and so forth.

The curated route management computing system 200 can be provided using any suitable processor-based device or system, such as a personal computer, laptop, server, mainframe, mobile computer, other processor-based device, or a collection (e.g. network) of multiple computers, for example. The curated route management computing system 200 can include one or more processors and one or more memory units. For convenience, only one processor 202 and only one memory unit 204 are shown in FIG. 7. The processor 202 can execute software instructions stored on the memory unit 204. The processor 202 can be implemented as an integrated circuit (IC) having one or multiple cores. The memory unit 204 can include volatile and/or non-volatile memory units. Volatile memory units can include random access memory (RAM), for example. Non-volatile memory units can include read-only memory (ROM) as well as mechanical non-volatile memory systems, such as a hard disk drive, optical disk drive, or other non-volatile memory. The RAM and/or ROM memory units can be implemented as discrete memory ICs.

The memory unit 204 can store executable software and data. When the processor 202 of the curated route management computing system 200 executes the software instructions of various modules, the processor 202 can be caused to perform the various operations of the curated route management computing system 200. The various operations of the curated route management computing system 200 can include communicating with the mobile communication devices 220 and 224 and/or the vehicle 226, transmitting data to the mobile communication devices 220 and 224 and the vehicle 226, receiving data from the mobile communication devices 220 and 224 and the vehicle 226, receiving data from a third party computing system (see e.g., route manager computing device 212), transmitting data to a third party computing system, as well as providing various types of graphical interfaces and portals for accessing and managing data stored or processed by the curated route management computing system 200, as described in more detail below.

The curated route management computing system 200 can store and access data in a variety of databases 206. The data stored in the databases 206 can be stored in a non-volatile computer memory, such as a hard disk drive, read only memory (e.g. a ROM IC), or other types of non-volatile memory. In some embodiments, one or more databases of the databases 206 can be stored on a remote electronic computer system and can be accessed by the curated route management computing system 200 via a network. As one having ordinary skill in the art would appreciate, a variety of other databases or other types of memory storage structures can be utilized or otherwise associated with the curated route management computing system 200.

Also shown in FIG. 7, the curated route management computing system 200 can include one or more computer servers, which can include one or more web servers, one or more application servers, and/or other types of servers. For convenience, only one web server 210 and one application server 208 are depicted in FIG. 7, although one having ordinary skill in the art would appreciate that the disclosure is not so limited. The servers 208, 210 can cause content to be sent to the mobile communication devices 220 and 244 and/or the vehicle 226, or other computing devices, via a network in any of a number of formats. The servers 208, 210 can be comprised of processors (e.g. CPUs), memory units (e.g. RAM, ROM), non-volatile storage systems (e.g. hard disk drive systems), and other elements. The servers 208, 210 may utilize one or more operating systems including, but not limited to, Solaris, Linux, Windows Server, or other server operating systems.

In some embodiments, the web server 210 can provide a graphical web user interface through which various users can interact with the curated route management computing system 200, examples of which are described in more detail below with regard to FIG. 10. The graphical web user interface can also be referred to as a graphical user interface, user portal, user interface, graphical client interface, and so forth. The web server 210 can accept requests, such as HTTP requests, from clients and serve the client's responses, such as HTTP responses, along with optional data content, such as web pages (e.g. HTML documents) and linked objects (such as images, video, documents, data, and so forth). The application server 208 can provide a user interface for users who do not communicate with the curated route management computing system 200 using a web browser. Such users can have special software installed on their computing device to allow the user to communicate with the application server 208 via a network. Examples of example interfaces that are provided by specialized applications are described in more detail below with regard to FIGS. 8-9.

Figure 8:
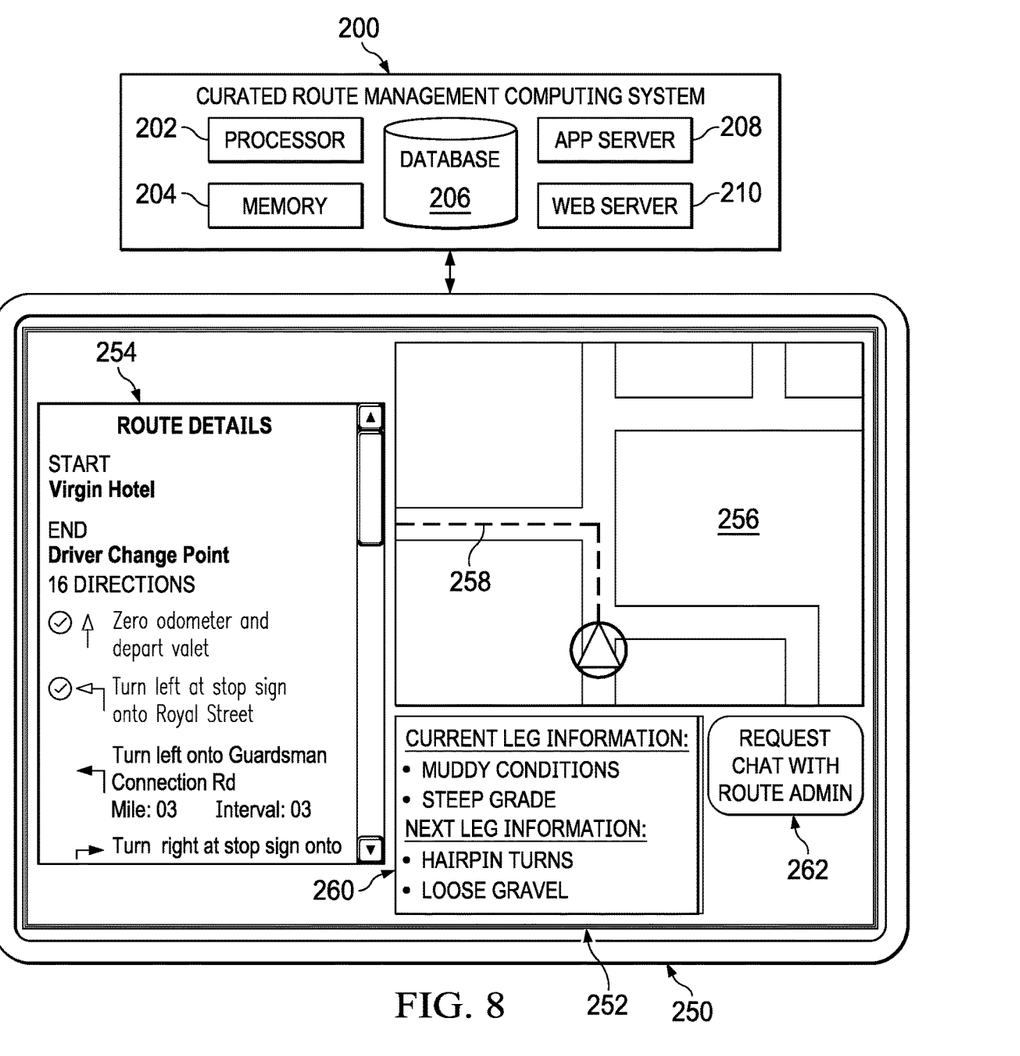
FIG. 8 shows a simplified example route interface displayed on a computing device.

Referring now to FIG. 8, a simplified example route interface 252 displayed on a computing device 250 is depicted. The computing device 250 can be any suitable type of networked computing device, as described above. As is to be appreciated, the layout, content, and size of the route interface 252 can vary without departing from the scope of the present disclosure. In the illustrated example, the route interface 252 includes a turn listing portion 254 and a mapping portion 256. The mapping portion 256 shows a curated navigational route 258 and the turn listing portion 254 provides real-time turn-by-turn instructions for maintaining travel on the curated navigational route 258. The example route interface 252 can include additional content as well, such as an informational window 260 and a chat function 262. The informational window 260 can display, for example, real time information regarding the curated navigational route 258 based on the user's current location. The real time information can be entered by the route manager, for example. The chat function 262 can be an onscreen interface that allows a user to initiate a chat room, or other type of messaging or communication, with an administrator or other personnel.

Figure 9:
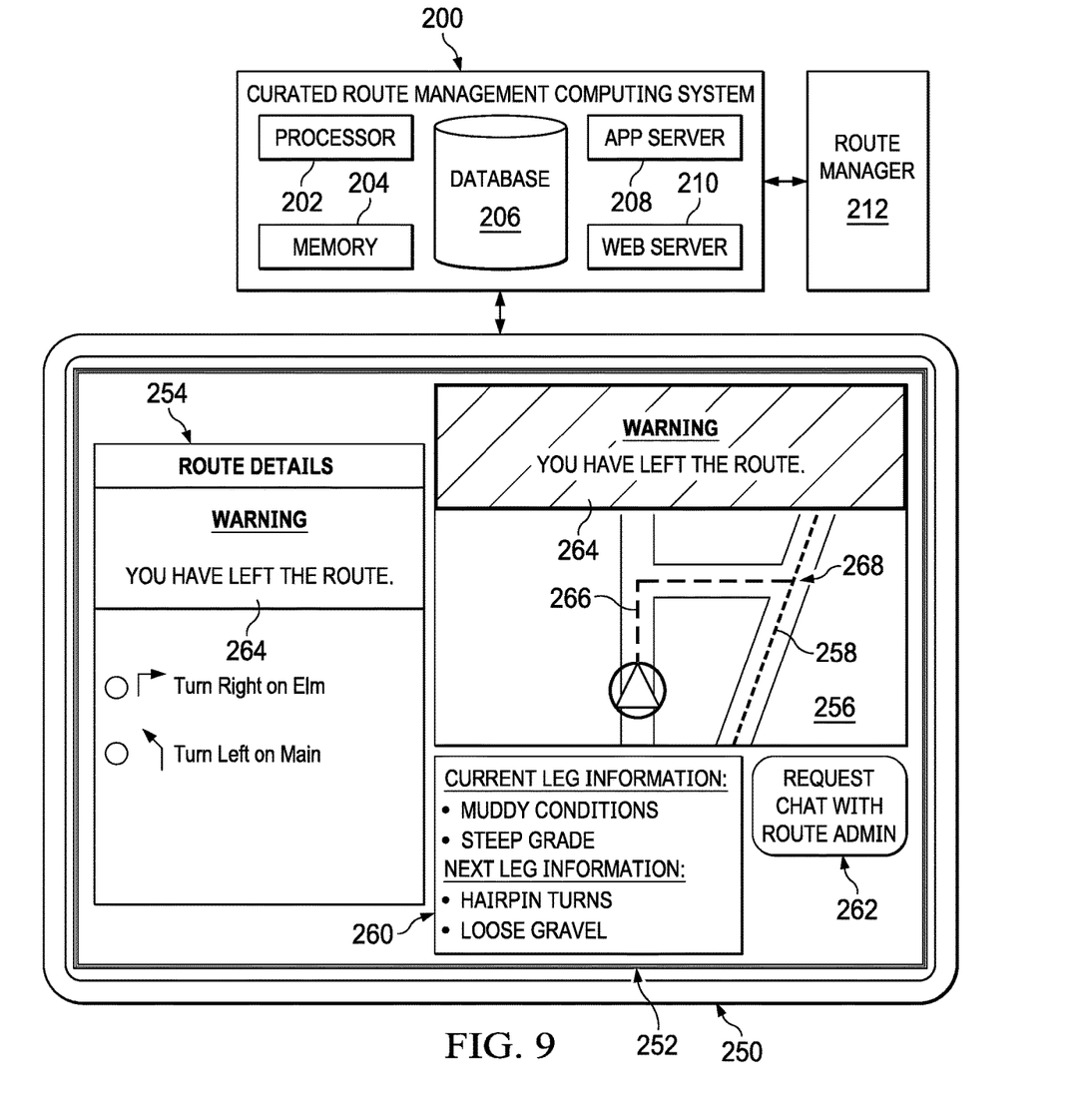
FIG. 9 depicts an example route interface when a user deviates from a curated navigational route.

FIG. 9 depicts the example route interface 252 when the user deviates from the curated navigational route 258. As shown, once the curated route management computing system 200 determines the vehicles is off course, one or more audio and/or visual warnings 264 can be presented to the user. The warnings 264 can inform the user that they have deviated from the route and provide them instructions to return to the curated navigational route 258. As shown, the turn listing portion 254 can include a series of instructions to route the user along an alternative route 266 in order to re-route the user to the curated navigational route 258. Based on the location of the user, the curated route management computing system 200 can determine the closest, or otherwise most appropriate, rejoinder point 268 to minimize the user's traveling on a non-curated route. Once the user has returned to the curated navigational route 258, the warnings 264 can be removed from the route interface 252.

Figure 10:
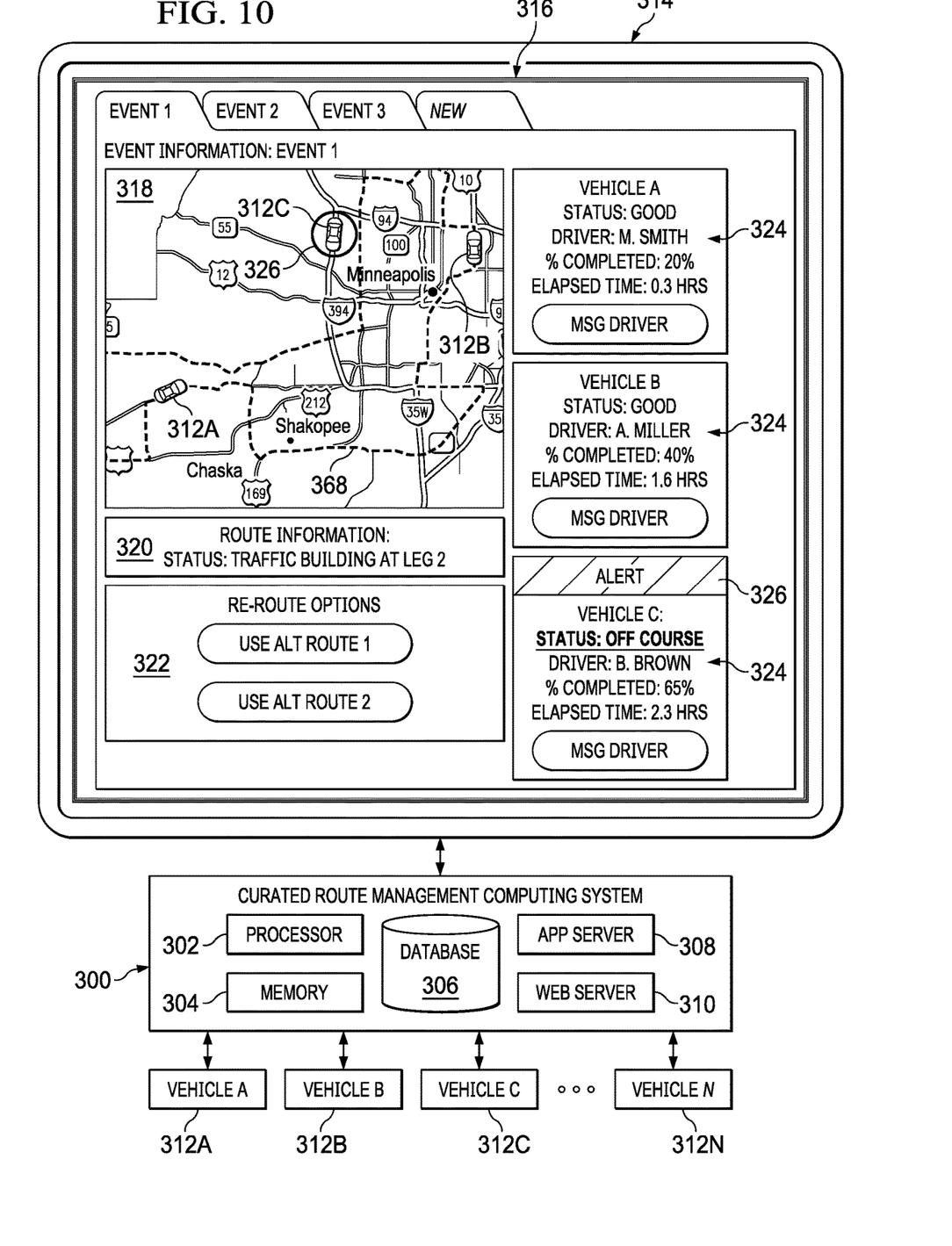
FIG. 10 shows a simplified example route management interface displayed on a computing device.

Referring now to FIG. 10, a simplified example route management interface 316 displayed on a computing device 314 is depicted. The computing device 314 can be similar to, for example, a route manager computing device 212, or other suitable computing device. The route management interface 316 can be hosted by a curated route management computing system 300. The curated route management computing system 300 can have a processor 302, a memory unit 304, one or more databases 306, one or more web servers 310, and one or more app servers 308. As shown, the curated route management computing system 300 can be in networked communication with one or more vehicles 312A, 312B . . . 312N. A user can interact with the route management interface 316 to design a curated navigational route 368 and subsequently observe real-time progress as the vehicles 312A, 312B . . . 312N along the route. In some embodiments, the route management interface 316 can include a mapping portion 318 that shows the curated navigational route 368, along with a graphical indication of the geographic location of each vehicle 312A, 312B . . . 312N. The route management interface 316 can also include user-specific data 324 for each of the vehicles and/or users. For instance, the user-specific data 324 can include a summary of the driver's progress, among other parameters or feedback.

A route information section 320 can provide real-time information regarding the curated navigational route 368, such as traffic conditions, weather, obstructions, and so forth. In the illustrated embodiment, the user is provided with a re-route option section 322 that includes two different pre-designed alternate routes that can be pushed to the vehicles 312A, 312B . . . 312N. Once pushed to the vehicles 312A, 312B . . . 312N, they can be directed to travel on the alternate route instead of the originally designed curated navigational route 368.

FIG. 10 also shows example alerts 326 regarding vehicle 312C. As shown, a graphical alert 326 on the mapping portion 318 and a banner alert 326 on the user-specific data 324 for vehicle 312C can inform the user of the route management interface 316 that a vehicle is off course. The mapping portion 318 can display the alternate route that is determined by the curated route management computing system 300 to return the vehicle 312C to the curated navigational route 368. The user of the route management interface 316 can observe the progress of the vehicle 312C to confirm that the vehicle properly returns to the curated navigational route 368.

Figure 11:
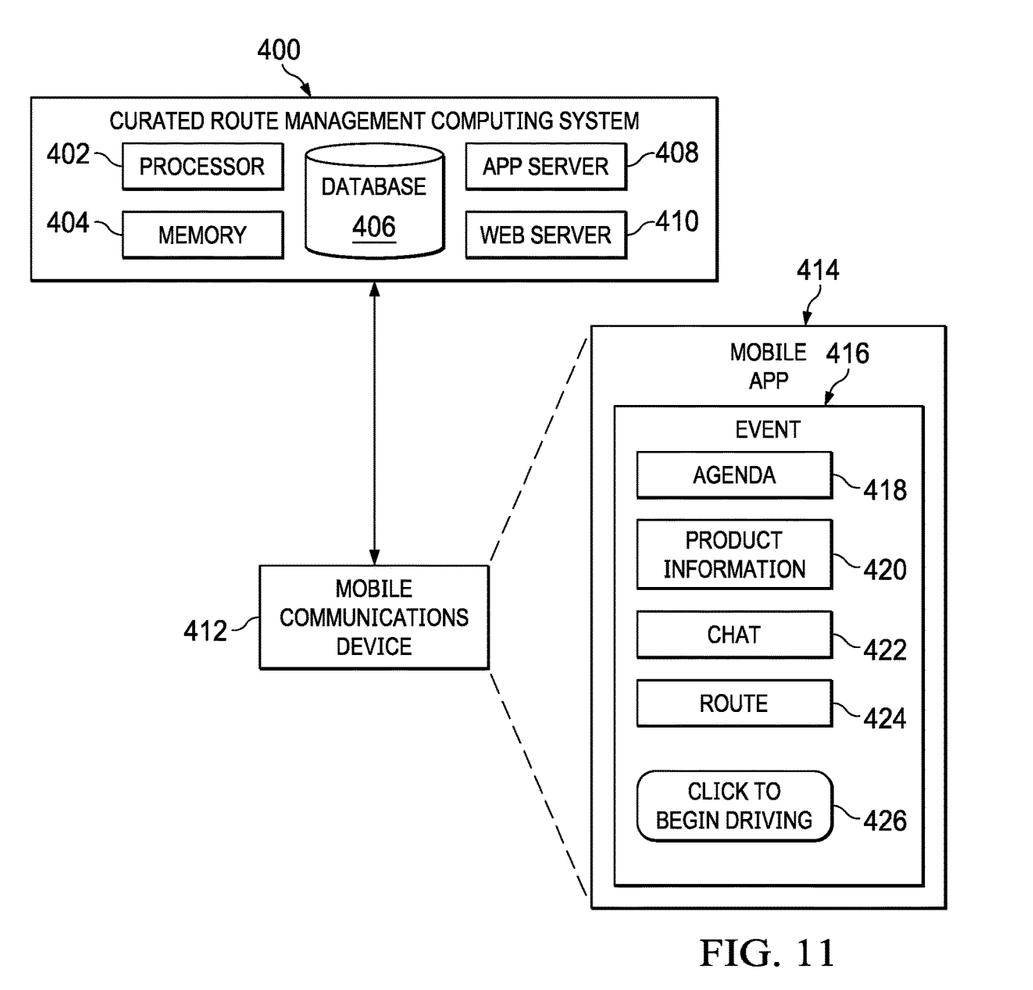
FIG. 11 depicts a simplified interface of a mobile application that is executing on a mobile communications device.

In some embodiments, the navigational function described herein can be provided through a multi-function mobile application that can be installed on mobile computing devices or installed for execution by a vehicle's operating system. For example, the multi-function mobile application can be designed for attendees of an event or function. FIG. 11 depicts a simplified interface 416 of a mobile application 414 that is executing on a mobile communications device 412. The mobile communications device 412 can be in communication with a curated route management computing system 400. The curated route management computing system 400 can have a processor 402, a memory unit 404, one or more databases 406, one or more web servers 410, and one or more app servers 408, similar to the curated route management computing systems described above. The mobile application 414 can provide various information to a user of the mobile communications device 412, such as an event agenda 418, product information 420, a chat function 422, and a route overview 424. Initiation of the real-time tracking and navigation described herein can be initiated, for example, by activation of an icon 426, or through other suitable means.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations. It can be appreciated that the examples are intended primarily for purposes of illustration for those skilled in the art. No particular aspect or aspects of the examples are necessarily intended to limit the scope of the present disclosure. For example, no particular aspect or aspects of the examples of system architectures, table layouts, or report formats described herein are necessarily intended to limit the scope of the disclosure.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments have been described herein, it should be apparent, however, that various modifications, alterations and adaptations to those embodiments may occur to persons skilled in the art with the attainment of some or all of the advantages of the present disclosure. The disclosed embodiments are therefore intended to include all such modifications, alterations and adaptations without departing from the scope and spirit of the present disclosure as set forth in the appended claims.

The invention claimed is:

1. A computer-based method, comprising:
receiving, by a curated route management computing system, a curated navigational route from a human operator interacting with the curated route management computing system, wherein the curated navigational route is a customized path of travel designed by the operator, wherein the customized path of travel is through a geographic region and connects a starting point in the geographic region and an ending point in the geographic region;
receiving, by the curated route management computing system, information related to the customized path of travel from the operator;
receiving, by the curated route management computing system, an alternate route from the operator, wherein the alternate route deviates from the curated navigational route;
subsequent to receiving the curated navigational route from the operator, displaying, by the curated route management computing system, turn-by-turn instructions of the curated navigational route on an interface of a mobile communication device, wherein the mobile communication device is associated with a vehicle traveling along the curated navigational route, wherein the operator is not in the vehicle;
monitoring, by the curated route management computing system, a real-time path of travel of the vehicle;
displaying, by the curated route management computing system, the information related to the customized path of travel from the operator on the interface of the mobile communication device based on the real-time path of travel of the vehicle along the curated navigational route;

receiving, by the curated route management computing system, a real-time selection of the alternate route by the operator; and providing, by the curated route management computing system, to the vehicle traveling along the curated navigational route turn-by-turn instructions of the alternate route to the interface of the mobile communication device.

2. The computer-based method of claim 1, further comprising:

determining, by the curated route management computing system, that the vehicle is deviating from the curated navigational route; and responsive to determining that the vehicle is deviating from the curated navigational route, determining, by the curated route management computing system, a corrective route navigating the vehicle to the curated navigational route based on a location of the vehicle.

3. The computer-based method of claim 2, further comprising:

displaying, by the curated route management computing system, turn-by-turn instructions articulating the corrective route on the interface of the mobile communication device.

4. The computer-based method of claim 2, further comprising:

based on the determined deviation, displaying, by the curated route management computing system, a warning on the interface of the mobile communication device.

5. The computer-based method of claim 4, further comprising:

subsequent to the vehicle following the corrective route, removing, by the curated route management computing system, the warning from the interface of the mobile communication device.

6. The computer-based method of claim 1, wherein the alternate route deviates from the curated navigational route at a first point along the curated navigational route and returns to the curated navigational route at a second point along the curated navigational route.

7. The computer-based method of claim 6, wherein each of the first and second points are different from each of the starting and ending points.

8. A curated route management computing system, the curated route management computing system comprising instructions stored in a memory, which when executed by one or more processors of the curated route management computing system, cause the curated route management computing system to:

receive a curated navigational route from a human operator interacting with the curated route management computing system, wherein the curated navigational route is a customized path of travel through a geographic region that connects a starting point and an ending point, wherein the customized path of travel comprises a plurality of legs, wherein each of the plurality of legs extends along a respective portion of the customized path of travel, wherein each of the plurality of legs is configured by the operator to navigate a vehicle on a specific type of roadway;

receive information related to the specific type of roadway from the operator;

receive an alternate route from the operator, wherein the alternate route deviates from the curated navigational route;

display turn-by-turn instructions of the curated navigational route on an interface of a mobile communication device, wherein the interface is provided by any of the mobile communication device and the vehicle, wherein the mobile communication device is associated with the vehicle traveling along the curated navigational route;

monitor a real-time path of travel of the vehicle;

display the information related to the specific type of roadway on the interface of the mobile communications device based on a location of the vehicle;

receive a real-time selection of the alternate route by the operator; and provide to the vehicle traveling along the curated navigational route turn-by-turn instructions of the alternate route to the interface of the mobile communication device.

9. The curated route management computing system of claim 8, wherein the instructions stored in the memory further cause the curated route management computing system to:

determine that the vehicle is deviating from the curated navigational route;

responsive to determining that the vehicle is deviating from the curated navigational route, determine a corrective route navigating the vehicle to the curated navigational route based on a location of the vehicle; and display turn-by-turn instructions articulating the corrective route on the interface of the mobile communication device.

10. The curated route management computing system of claim 9, wherein the instructions stored in the memory further cause the curated route management computing system to:

based on a determination that the vehicle has deviated from the curated navigational route, display a warning on the interface of the mobile communication device.

11. The curated route management computing system of claim 10, wherein the instructions stored in the memory further cause the curated route management computing system to:

determine, based on a location of the vehicle, a corrective route; and display turn-by-turn instructions articulating the corrective route on the interface of the mobile communication device.

12. The curated route management computing system of claim 11, wherein the instructions stored in the memory further cause the curated route management computing system to:

subsequent to the vehicle following the corrective route, remove the warning from the interface of the mobile communication device.

13. The curated route management computing system of claim 8, wherein the instructions stored in the memory further cause the curated route management computing system to:

display on an interface of an operator computing device real-time positions of each of a plurality of vehicles simultaneously, wherein each of the plurality of vehicles is traveling along the curated navigational route.

14. A computer-based method performed by a curated route management computing system, comprising:

receiving a curated navigational route from a human operator interacting with the curated route management computing system, wherein the curated navigational route is a customized path of travel through a geographic region connecting a starting point in the geographic region and an ending point in the geographic region, wherein the customized path of travel is configured by the operator so as to navigate a vehicle through a point of interest in the geographic region;

receiving information related to the point of interest from the operator;

receiving at least one alternate route from the operator, wherein each of the at least one alternate routes deviates from the curated navigational route;

subsequent to receiving the curated navigational route from the operator, displaying turn-by-turn instructions of the curated navigational route on an interface of a mobile communication device associated with a vehicle traveling along the curated navigational route, wherein the operator is not in the vehicle;

displaying the information related to the point of interest on the interface of the mobile communication device when the vehicle is at the point of interest in the geographic region;

receiving a real-time selection of one of the at least one alternate routes by the operator; and providing to the vehicle traveling along the curated navigational route turn-by-turn instructions of the selected alternate route to the interface of the mobile communication device.

15. The computer-based method of claim 14, further comprising:
  determining that the vehicle is deviating from the curated navigational route;
  responsive to determining that the vehicle is deviating from the curated navigational route, determining a corrective route navigating the vehicle to the curated navigational route based on a location of the vehicle; and
  displaying turn-by-turn instructions articulating the corrective route on the interface of the mobile communication device.

16. The computer-based method of claim 15, further comprising:
  based on the determined deviation, displaying a warning on the interface of the mobile communication device.

17. The computer-based method of claim 16, further comprising:
  subsequent to the vehicle following the corrective route, removing the warning from the interface of the mobile communication device.

18. The computer-based method of claim 14, wherein each of the alternate routes deviate from the curated navigational route and returns to the curated navigational route at points that are different from the starting and ending points.

19. The computer-based method of claim 14, wherein the vehicle is an automobile.

20. The computer-based method of claim 14, wherein the vehicle is not an automobile.

* * * * *